J. R. MEINERS.
NUT LOCK.
APPLICATION FILED APR. 13, 1905.
No. 908,022.
Patented Dec. 29, 1908.
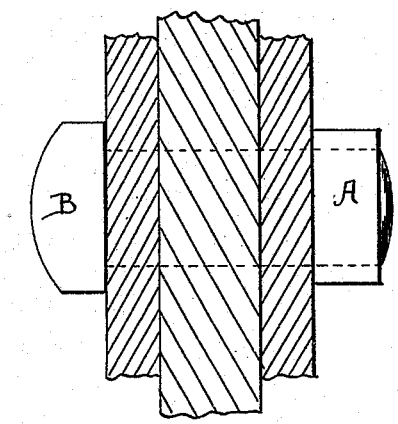
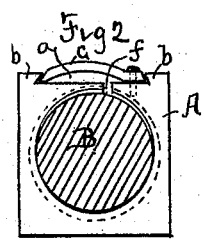
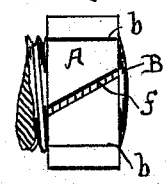
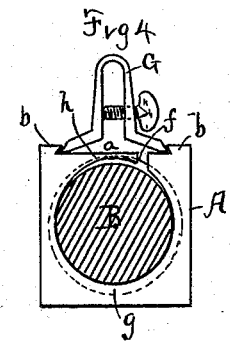
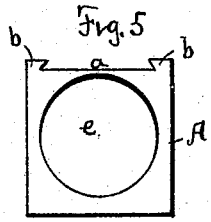
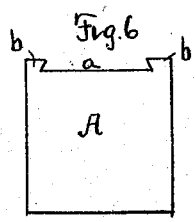
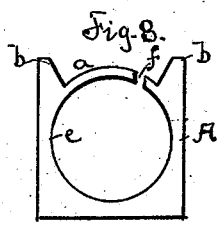
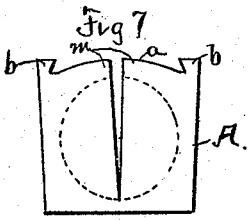

UNITED STATES PATENT OFFICE.

JOHN R. MEINERS, OF NEW YORK, N. Y.

NUT-LOCK.

No. 908,022.     Specification of Letters Patent.     Patented Dec. 29, 1908.

Application filed April 13, 1905. Serial No. 255,323.

*To all whom it may concern:*

Be it known that I, JOHN R. MEINERS, a citizen of the United States, and resident of New York, borough of Manhattan, in the county of New York and State of New York, have invented certain new and useful Improvements in Nut-Locks, of which the following is a specification.

My invention relates to nut locks and the object is to produce a nut, which will grip the bolt eccentrically, thereby preventing the same (the nut) from turning back from accidental or other causes.

My invention consists in tapping the nut eccentrically.

Referring to the drawing of which Figure 1 is a side view of a bolt showing my improved nut attached thereon. Fig. 2 is a face view of the nut showing the same in its natural unexpanded position and having a stationary spanner attached thereto and also showing the bolt in section. Fig. 3 is a top view of the nut. Fig. 4 is another face view of the nut showing the same open or expanded and having a detachable spanner thereon, and also showing the bolt in section. Fig. 5 is a face view of the nut before it is divided and tapped or threaded, but showing the initial hole or opening. Fig. 6 is a face view of the blank, before the initial hole is bored. Fig. 7 is a face view of a modified formation of the blank nut. Fig. 8 is a face view of a nut showing a modification of the shoulders of the depression, illustrating different ways of expanding the nut.

"A" represents the nut which can be made of any size and shape of any suitable metal. "B" is the bolt.

One of the sides of the nut is provided with a depression "a" having beveled shoulders "b b". The nut consists of a blank as shown in Fig. 6. A hole "e" is then bored through the same as shown in Fig. 5. After this hole has been bored the nut is divided as shown in Figs. 2, 3, 4 by the incision "f". Then the nut is expanded as shown in Fig. 4, by a spanner "G" of the construction shown in Fig. 2 or of the construction shown in Fig. 4 or of any other improved construction. When the nut is expanded the hole "e" will become an outward eccentric or an irregular circle, see Fig. 4. When in this position the hole is tapped or threaded, see dotted lines. The threads in this case will then be a true circle, in which case the threads will be deeper at "g" than at "h", see Fig. 4, and the sides in proportion. The nut thus threaded and expanded is easily screwed on and off the bolt. When screwed on the bolt the required distance the spanner is released, thus allowing the severed part of the nut to contract the nut, thereby causing the upper jaws "m" of the nut to grip upon the bolt in the manner of an eccentric, thus preventing the nut from turning on or off, thereby firmly securing the same on any part of the said bolt.

It should be understood that when the nut is not expanded the hole "e" is a true circle, and the threads are an inward eccentric or an irregular circle, but when the nut is expanded the hole "e" becomes an outward eccentric or irregular circle, and the threads become a true circle.

I am aware that the foregoing result can be accomplished without departing from the principle of this invention by taking a blank nut as shown in Fig. 7 and cutting down from the top of the same to a certain distance from the bottom (see "m" Fig. 7). The severed parts are then expanded as shown in Fig. 7 and a hole (see dotted lines) bored through making a true circle. The threads are then cut into the same, when the severed parts are partly contracted, and when fully contracted the threads form an eccentric or irregular circle on the bolt. In order to increase the efficiency or locking of the nut when in position the threads of the bolt are burred or bruised by passing or inserting an implement into the slot "f" of the nut, and then gently tapping the said implement.

I claim—

1. A cleft nut having threads cut therein shallow at one point of the bore and deeper on the opposite point thereof, for the purpose of giving the said threads an eccentric formation at such points.

2. A cleft expanded nut having threads cut therein, shallow at the cleft side "h," and deeper at "g," on the opposite side as described for the purpose of giving the said threads an eccentric formation when the nut is in a normal condition.

Signed at New York in the county of New York and State of New York this 12th day of April, A. D. 1905.

JOHN R. MEINERS.

Witnesses:
    GROVER C. MEINERS,
    FRANKLIN BARRETT.